United States Patent [19]

Parker

[11] 4,445,787
[45] May 1, 1984

[54] SURFACE TEMPERATURE MEASURING DEVICE WITH REVERSIBLE THERMOCHROMIC FILM

[76] Inventor: Robert Parker, 411 Rolling Hills La., Alamo, Calif. 94507

[21] Appl. No.: 365,763

[22] Filed: Apr. 5, 1982

[51] Int. Cl.$^3$ .................. G01K 1/16; G01K 11/12
[52] U.S. Cl. .................. 374/141; 30/346.52; 30/51; 374/162; 374/208
[58] Field of Search .................. 374/141, 162, 208; 252/962; 30/140, 346.52

[56] References Cited

U.S. PATENT DOCUMENTS

| | | | |
|---|---|---|---|
| 3,002,385 | 10/1961 | Wahl et al. | 252/962 X |
| 3,031,888 | 5/1962 | Wilhelm | 374/155 X |
| 3,382,512 | 5/1968 | Atchley | 374/141 X |
| 3,704,625 | 12/1972 | Seto et al. | 374/162 |
| 3,779,079 | 12/1973 | Snook | 374/144 |
| 3,955,420 | 5/1976 | Parker | 252/962 X |
| 4,070,911 | 1/1978 | Makin | 374/208 |
| 4,075,458 | 2/1978 | Moyer | 30/140 X |
| 4,095,467 | 6/1978 | McGlynn | 374/183 X |
| 4,137,769 | 2/1979 | Parker | 374/134 |

*Primary Examiner*—Daniel M. Yasich
*Attorney, Agent, or Firm*—Paul Hentzel

[57] ABSTRACT

An array of thermochromic cells is formed along the end portion of a thin, highly conductive blade. Each cell is visually responsive to a critical temperature incrementally different from the critical temperatures of the other cells. The thermochromic array defines a set of temperature ranges, set off by the critical temperatures. The undersurface of the end portion is pressed down into contact with the hot surface of an object of unknown temperature. The contact pressure is established and maintained constant by bending the blade against the surface. The high elastic strength of the blade permits generous bends having high bending moments without creating a permanent set in the blade. Heat from the hot surface flows upward across the contact area and into the interior of the thin blade. The interior increase in temperature uniformly, with minimum pertubation; and the end portion rapidly obtains an equilibrium temperature substantially equal to the temperature of the object surface. Heat transients are minimal because the contact area is very large relative to the extreme thinness, and small thermal mass, of the blade. The array of thermochromic cells on the top surface of the end portion simultaneously receive heat from the interior. The cells having a lower critical temperature then the equilibrium temperature undergoes the visual change. The condition of the array reveals the equilibrium temperature to within one temperature increment.

18 Claims, 4 Drawing Figures

SURFACE TEMPERATURE MEASURING DEVICE WITH REVERSIBLE THERMOCHROMIC FILM

TECHNICAL FIELD

This invention relates to rapid thermochromic measurement of surface temperatures, and more particularly to thermochromic cells bonded to a very thin base which is urged into contact with the object surface.

BACKGROUND

Heretofore, electronic devices have been available for measuring surface temperature, i.e. thermocouples, infrared detectors, thermistors. These devices are costly to purchase and maintain, required batteries or an external power source, were bulky, and easily damaged.

Thermochromic devices such as shown in U.S. Pat. No. 3,002,385 to Wahl, U.S. Pat. No. 2,928,791 to Laconti, and U.S. Pat. No. 4,137,769 to Parker, avoid many of these problems. However, these devices are permanently bonded to the surface in order to provide the required for good thermal contact. The devices may not be removed, and remounted on another site.

U.S. Pat. No. 3,955,420 and U.S. Pat. No. 3,827,301, both to Parker teach a rod thermochromic device with cooling fin heat exchange characteristics. The tip of the device is pressed against the surface to be measured. A temperature gradient is established along the device causing a progressive thermochromic change extending outward from the contact end. The surface temperature is indicated by the extend of the thermochromic change present at equilibrium. This rod device requires many seconds to reach the equilibrium required for accurate readings. The time element is especially burdensome when measuring high surface temperatures which have a correspondingly high transient time.

SUMMARY

It is therefore an object of this invention to provide a reversible thermochromic temperature indicating device which is very fast.

It is another object of this invention to provide such a device which has a uniformly short measurement period.

It is a further object of this invention to provide such a device which has minimum initial pertubation effects.

It is a further object of this invention to provide such a device which has minimum steady state pertubation effects.

It is a further object of this invention to provide such a device which is passive, and does not require an external source of power.

It is a further object of this invention to provide such a device which is inexpensive, reliable, rugged, and accurate.

It is a further object of this invention to provide such a device which has a constant and reproducible contact pressure and heat exchange flow rate.

Briefly, these and other objects of the present invention are accomplished by providing a thermally conductive thin member having a contact side and a cell array side opposed thereto. The contact side is placed in heat transfer engagement with the surface to be measured defining an active heat transfer area on the contact side, and a corresponding active volume within the portion of the thin member adjacent thereto. Heat from the surface simultaneously flows across each region of the active area into the thin active volume. Each region of the active volume simultaneously obtains an equilibrium temperature substantially equal to the temperature of the object surface. An array of cells containing a reversible thermochromic material form a thin layer on the array side of the thin member. Each of the cells responds to the heat within the thin member at a different critical temperature determined by the composition of the thermochromic material therein. A resilient structure connects to the thin member for urging the contact side into firm heat transfer engagement with the object surface.

BRIEF DESCRIPTION OF THE DRAWING

Further objects and advantages of the thin blade construction and the operation of the thermochromic cell array will become apparent from the following detailed description and drawing in which.

GENERAL DESCRIPTION

FIG. 1

Figure 1:
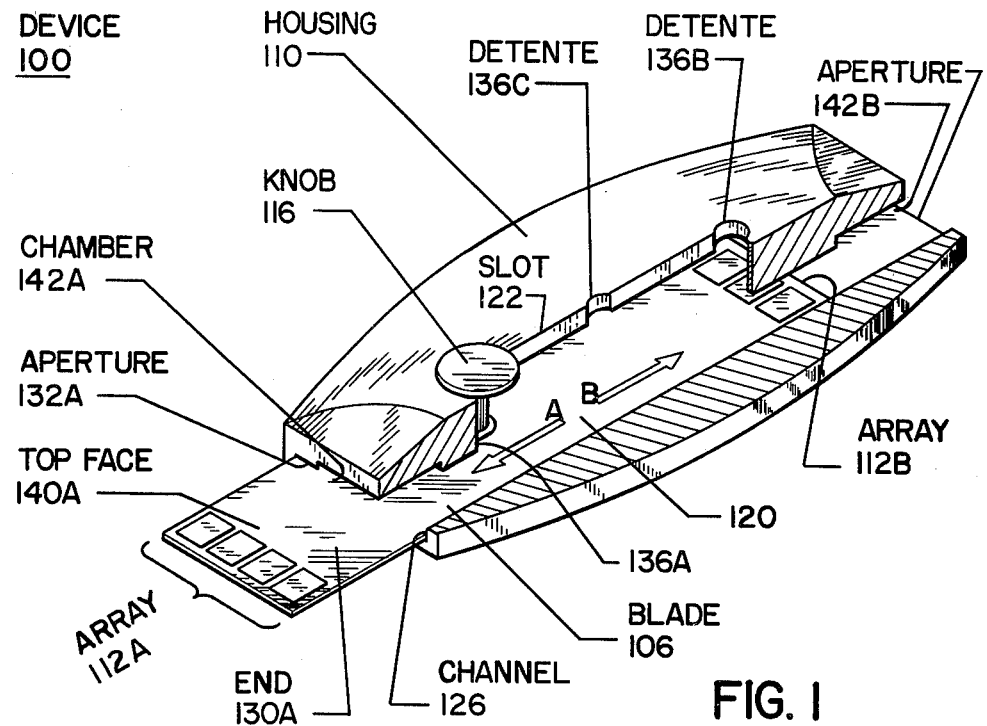
FIG. 1 is an isometric view, partially in section, showing a thin blade and the interior of the housing.

The temperature indicating device 100 has a thin blade 106 enclosed in an insulative handle or housing 110 as shown in the cut-away-view of FIG. 1. Thin blade 106 is highly conductive, and has an array of thermochromic films or coatings arranged in cells 112A at one end thereof and array 112B at the other end. The cell material is preferable bonded to blade 106 to enhance the heat exchange therebetween. Each cell visually responds at a different critical temperature defining a corresponding set of temperature increments which may be indicated by the arrays 112.

A displacement knob 116 projects upward from the center or base portion 120 of blade 106, and through a top slot opening 122 extending longitudinally along the top surface of housing 110. The user grips housing 110 in his hand, while sliding knob 116 along slot opening 122 with his thumb for displacing blade 106 along a longitudinal channel 126 within the housing 110. Base portion 120 is guided by the side walls of channel 126.

Blade 106 is normally in a retracted secure position within housing 110, and is displaced longitudinally (in the direction of arrow A) into the sensing position shown in FIG. 1. End portion 130A of blade 106 extends from housing 110 through a lateral aperture 132A. A detent 136A at the end of slot opening 122 catches knob 116 for retaining blade 106 in the extended measuring position.

If desired, blade 106 may have a slight bow along base portion 120 (showm more clearly in FIG. 2) for providing a resilient, light pressure against the ceiling and floor of longitudinal channel 126. The resulting static friction is easily overcome by the user, and eliminates free movement of blade 106 (i.e. vibrating, rattling around channel 120, slipping into the extended position while being transported in a tool box). In addition, the upwards bow pressure of blade 106 causes knob 116 to lock into detents 136. The user releases knob 116 from detents 136 by pressing knob downward prior to repositioning blade 106.

In the measuring position, cell array 112A on the top face 140A of end portion 130A is exposed and available for indicating one set of temperature increments. When the measurement is completed, blade 106 is returned to the secure position within housing 110 by sliding knob 116 to a center detent 136C. Each end of long channel 126 may terminate in a chamber 142 for storing end portions 130. Each chamber 142A and 142B has an elevated ceiling for preventing abrasive contact with arrays 112. End portion 130B at the other end of blade 106, is displaced into the other sensing position by sliding knob 116 in the other direction (arrow B) into detent 136B. Cell array 112B is exposed for indicating the other set of temperature increments.

BENDING MOMENT CONTACT PRESSURE

FIG. 2

Figure 2:
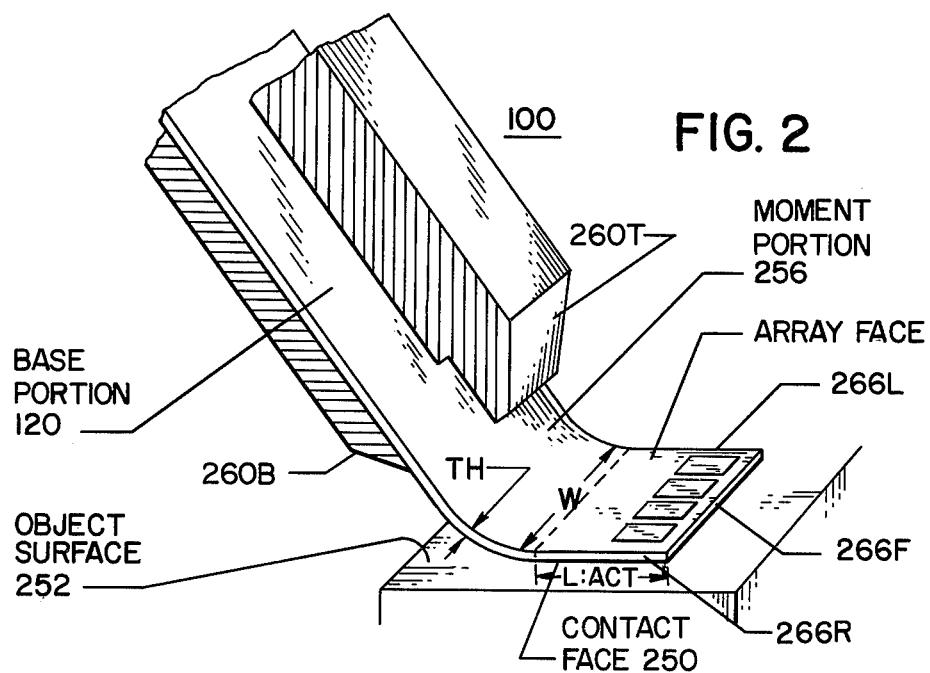
FIG. 2 is a sectional side view of the device of FIG. 1 showing the blade in contact with the surface to be measured.

The contact pressure between the bottom face 250 of extending end portion 130 and object surface 252, is established by the user as he positions device 100 at an angle over surface 252 (see FIG. 2). Blade 106 is bent along bending moment portion 256 between base portion 120 and end portion 130. The magnitude of the contact pressure is determined by the bending moment (the angle of device 100 relative to surface 252). The user can easily maintain a constant (and reproducible) contact pressure by holding his hand and wrist locked in the desired additude. For unusual situations requiring a greater contact pressure, a shorter length of end portion 130 may be extended from housing 110. The higher contact pressure is due to the same bending moment being applied along a shorter moment arm. Firmer blades of greater thickness or resilience may be employed to provide even greater contact pressures if required.

The absence of vertical support for device 100 may result in variations the initial height position of device 100 above object surface 252, and variations in height during the measurement. The pressure on contact face 250 is independent of these variations. Variations in height merely change the contact area, the active area of heat transfer between bottom contact face 250 and object surface 252. The fast response time of device 100 is unaffected by changes in active area because heat transferred into the active volume of the interior immediately above the active contact area is always proportional to the area of engagement.

Top bevel 260T at the end of housing 110 prevents obstruction of the user's view of array face 140 during use. Bottom bevel 260B permits closer, lower bending moment angles, between housing 110 and surface 256.

THERMAL EQUILIBRIUM BETWEEN BLADE AND SURFACE

Array face 140 of end portion 130 rapidly obtains an equilibrium temperature (T:eq) substantially equal to the temperature of surface 252 (T:sur). The area of lower face 250 in actual contact with surface 252 is the active area (A:act). Because A:act is large compared to the thickness (Th) of blade 106, end portion 130 has a high area to volume ratio for supporting the fast thermal response.

Assuming that lower face 250 reaches T:eq immediately upon contact with surface 252; then the time (t) for the active volume thereabove to reach T:eq is:

$$t = T(Th\text{ squared})(Row)c/K$$

where:
T is a dimensionless parameter,
Th is the thickness in Ft,
Row in the density,
c is the specific heat in BTUs/(F degrees), and
K is diffusivity in BTUs/HrFt(squared)/Ft(degrees F.).

For the case outlined in Conduction of Heat in Solids (Carslaw and Jaeger, 2nd edition 1959, Oxford Press) at pages 100 and 101, T:eq is essentially obtained when T is 1.5. The response time is highly dependent on thickness (Th) and thermal duffusivity (K). Both of these conditions have been optimized by employing a thin, highly conductive blade 106.

The top surface of active volume V:act and the surrounding object surface 252 lose heat to the atmosphere in an almost identical manner and rate. Both surfaces have the same conduction and radiation loss rates into the atmosphere; and both surfaces are subject to the same atmospheric convection currents. Further, V:act receives the same heat flow from the interior of the object as the surrounding portions of surface 252. These common thermal factors account for the close relationship between T:eq and T:sur. Thermally, V:act may be considered a continuation of the object, a conductive "skin" practically indistinquishable from the actual object surface 252.

In theory, an infintesimal difference exists between T:eq and T:sur. T:eq is slightly lower due to small secondary heat losses from V:act which are not present in the object-to-atmosphere heat flow. A secondary conduction loss flows out of V:act into the atmosphere through the sliver like vertical sides 266L (left) 266R (right) and 266F (front) of end portion 130. In general:

Vertical Side Surface 266L=266R=(L:act) (Th),

Vertical Side Surface 266F=(W) (Th), and the sum of the vertical side surfaces

A:side=(2L:act+W) (Th).

The heat lost by conduction through the three sides is:

Q:side=(A:side) (t:eq) (conductivity of air).

Q:side is minimal due to the thinness (Th) of blade 110 and the low conductivity of air; and is only a fraction of the corresponding conduction loss (Q:act) across the active area of array face 130. The rates of loss are proportional to the surface area, and A:act=(L:act) (W) A:side.

The effect of Q:side relative to Q:act can be reduced even further by increasing A:act Another source of heat loss from end portion 130 not present for surface 252, is the lateral heat spread into the remainder of blade 106:

Q:blade=(W) (Th) (T:eq) (blade conductivity).

Blade 106 is highly conductive, but extremely thin, which limits the blade loss. The additive effect of the small heat losses Q:side and Q:blade from end portion 130, cause T:eq to be slightly smaller than T:sur.

Preferably, array 112 is positioned on array face 140 next to front side 266F, to minimize the attenuation effect of Q:blade on T:eq. A slight equilibrium temp gradient extends into V:act from the blade side due to the escaping Q:blade heat. This temp gradient expires a short distance into V:act. The front region of array face 140 has a constant equilibrium temp, which is measured by the thermochromic material in array 112.

IRREGULAR OBJECT SURFACES

FIG. 3

Figure 3:
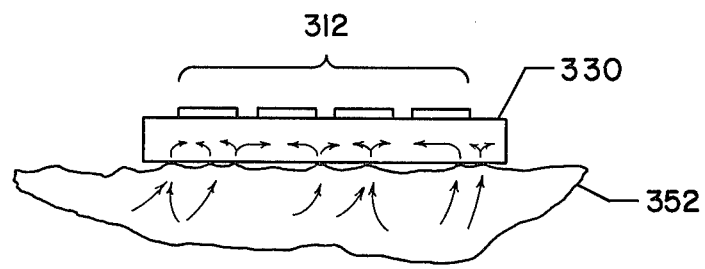
FIG. 3 is fragmentary sectional front view showing the blade in contact with the an irregular surface.

The irregular object surface shown in FIG. 3, has minute high points randomly distributed thereacross which engage bottom face 350. Each high point offers a small, but highly efficient, heat flow path from surface 352 into end portion 330. End portion 330 is a highly conductive heat plenum, and spreads the random input heat evenly thereacross. Each cell measures the same T:eq regardless of the uneven distribution of high points in surface 352. The contact pressure at each high point is intensified relative to the distributed contact pressure of the FIG. 1 planar engagement. The improved heat transfer rate through each high point compensates for the smaller total active area of rough contact face 350. The response time of the device remains very short, inspite of the irregular surface.

Because of the plenum effect of end portion 330, T:eq approaches the highest temperature within the area of surface 352 thereunder. T:eq is homogeneous throughout the active volume at a temperature determined by the maximum adjacent T:sur. If surface 352 develops a "hot spot", or is a relatively poor conductor with an operating temperature gradient thereacross, the high conductivity of the active volume causes the highest temperature to dominant. In most critical temperature situation, an accurate indication of the highest surface temperature is preferred.

SPRING RETURN FLAT BLADE

FIG. 4

Figure 4:
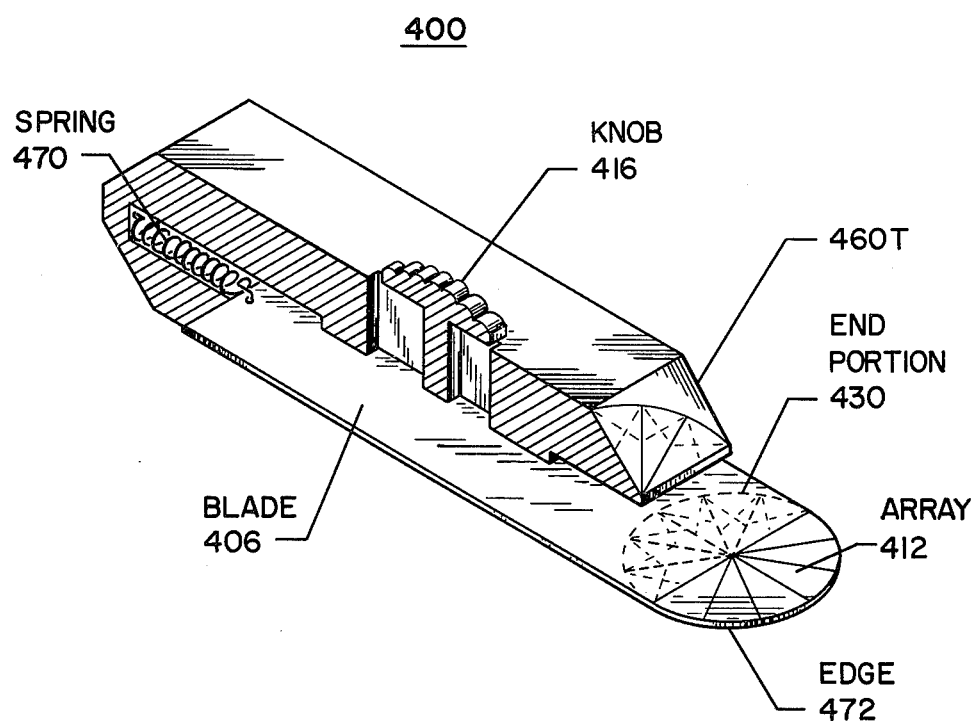
FIG. 4 is an isometric view, partially in section, showing a flat blade within a single ended housing.

A flat blade 406 with a return spring 470 may be employed as shown in FIG. 4. Blade 406 is always in the retracted position except, for the brief measuring period when the user is actually pressing against knob 416 to retain blade 406 in the extended position. When the measurement has been taken, the user releases knob 416, and blade 406 immediately slips back to the retracted position by the pulling force if spring 470. Due to the spring return, end portion 430 experiences a minimum of exposure during use; and can not be inadvertently stored in the extended position.

Device 400 is single ended, and measures temperatures from only one end thereof. Accordingly, device 400 has only one end portion 430 and cell array 412. End portion 430 may have a rounded leading edge 472 with array 412 arranged in arc segments. The critical temperature of each cell may be permanently printed or engraved on blade 406 adjacent to cell array 412 for user convenience (as shown in dotted lines), or on top bevel 460T.

Preferably, the cells are arranged in critical temperature sequence across array 412, from the lowest T:crit to the highest T:crit. The threshold of visible change (thermal response) rapidly advances across the array from the low end to the high end. The rate of advance is a valuable cue to the experienced user for indicating the approximate equilibrium temperature. The user can immediately sense when the temperature range of the device is too low for the surface temperature under measurement. The user can remove the device from the hot surface before thermally degrading or "burning" either the blade or array, and select a higher range device.

SPECIFIC EMBODIMENT

The following particulars of are given as an illustrative example of the present device. In this example:

Blade 106 may be 6 mils thick by one inch width, and formed of copper alloyed with beryllium for resilience. A dark coating is provided on the end portion under the cell array. At the critical temperature, the thermochromic material clears to show the black under coating. Each critical temperature may be printed in a constrasting or lighter color, directly under each cell. Upon clearing, the cell temperature is self revealing for user convenience.

Array 112 may be 2 mils thick, and formed of a suitable clearing point liquid crystal within hundreds of gelatin micro-capsules bonded with a polyvinylchloride binder. The binder permits the coating to thermally expand while maintaining a reliable bond with the underlying blade.

Housing 110 may be a polycarbonate material for providing thermal and electrical insulation. Pigment may be selectively added to the housing material for color coding each housing of a set of devices to indicate particular temperature ranges.

The dimensions and materials given above are not intended as defining the limitations of the invention. Numerous other applications and configurations are possible.

THERMOCROMIC MATERIALS

Various salts of mercury, such as $Cu_2HgI_4$ or $HgI$, may be employed as the cell material. These salts change from a body centered crystal below T:crit, to a face centered crystal above T:crit. The two crystal orientations exhibit differential absorbtion spectrums, or defraction characteristics, for indicating temperature change. Detailed information concerning suitable salts of mercury may be obtained from U.S. Pat. No. 4,137,769 to Parker, which is hereby incorporated into this disclosure in its entirety.

Clearing point liquid crystals may also be employed as the thermochromic material. Crystals at temperatures below T:crit defract incident light rendering the liquid crystals an opaque green or blue color. At the critical clearing point temperature, the liquid becomes a true, optically clear, liquid.

In addition, solids such as wax having certain melting characteristics, may be employed in the cell array. These materials are opaque at low temperatures, and melt into a transparent liquid at the critical temperature.

INDUSTRIAL APPLICABILITY

It will be apparent to those skilled in the art that the objects of this invention have been achieved by providing a passive, thin blade, device which functions on the heat energy of the surface to be measured in combination with the internal resilence of the blade. The thinness of the blade shortens the response time, and minimizes pertubation effects. The simple construction favors ruggedness and reliability. The reversible thermochromic material yields accurate measurements, and reusable indefinitely.

CONCLUSION

Clearly various changes may be made in the structure and embodiments shown herein without departing from the concept of the invention. For example the blade may be fixed in the extended position, and stored with a removable cover over the thermochromic array. The blade may be formed of other highly conductive material, such as aluminum or silver, reinforced with a resilient backing. The thermochromic material may form a single elongated cell having a composition gradient thereacross. Such a device more precisely indentifies the equilibrium temperature within a temperature range defined by the end compositions of the gradient. The present device has been shown in use with a horizontal object surface. However, the surface to be measured may have any orientation. The operation of the blade and cell array is position insensitive. Further, the features of the embodiments shown in the various Figures may be employed with the embodiments of the other Figures.

Therefore, the scope of the invention is to be determined by the terminology of the following claims and the legal equivalents thereof.

I claim as my invention:

1. A heat responsive device for measuring the surface temperature of an object, comprising:
   a thermally conductive thin member formed by an end portion, having a contact side and an opposed indicator side, and a flexible resilient portion;
   the contact side adapted to be placed into heat transfer engagement with the object surface defining an active heat transfer area on the contact side and a thin active volume within the portion of the thin member adjacent thereto, heat from the object simultaneously flows across each portion of the active area into each adjacent portion of the active volume for causing the entire active volume to uniformly increase in temperature and to simultaneously obtain an equilibrium temperature substantially equal to the temperature of the object surface;
   reversible thermochromic material forming a thin layer on the indicator side of the thin member end portion, and responsive to the heat within the thin member at a critical temperature determined by the composition of the material for indicating the temperature of the thin member end portion;
   support means for supporting the thin member; and
   the flexible resilient portion of the thin member extending between the end portion thereof and the support means, which bends as the end portion engages the object surface to provide a constant bending moment for urging the contact side of the end portion into engagement with the object surface, and for providing a constant heat transfer pressure therebetween.

2. The heat responsive device of claim 1, wherein the thin active volume adjacent to the active area defines an opposed active area on the portion of the indicator side adjacent to the active volume, and the thermochromic layer is formed within the opposed active area.

3. The heat responsive device of claim 1, wherein the thermochromic material has a continuous composition gradient thereacross for causing the material to respond to critical temperatures within a range of temperatures.

4. The heat responsive device of claim 1, wherein the thermochromic material forms a series of cells each having a uniform composition incrementally different from the composition of each of the other cells for responding to a critical temperature incrementally different from the critical temperature of each of the other cells, for indicating a series of specific critical temperatures within a range of temperatures.

5. The heat responsive device of claim 4, wherein each thermochromic cell is positioned adjacent to the cell responsive to the next lowest critical temperature and adjacent to the cell responsive to the next highest critical temperature.

6. The heat responsive device of claim 1, wherein the thermochromic material is a clearing point liquid crystalline material.

7. The heat responsive device of claim 6, wherein the thermochromic material is micro-encapsulated.

8. The heat responsive device of claim 1, wherein the thermochromic material changes from a lower temperature crystalline phase to a higher temperature crystalline phase as the critical temperature is exceeded.

9. The heat responsive device of claim 8, wherein the thermochromic material is a salt of mercury.

10. The heat responsive device of claim 1, wherein the thin member is formed of a copper-beryllium alloy.

11. A hand tool having a retracted secure position and an extended measuring position for rapidly indicating the surface temperature of an object to a user when in the extended measuring position, comprising:
   a flat thin elongated blade made of a resilient highly conductive material having a measuring end portion and a support base portion and a bending moment portion therebetween;
   an elongated housing adapted to be grasp by the user, having a longitudinal channel therethrough for containing the blade and for guiding the movement of the blade during displacement of the blade between the retracted secure position in which the end portion is within the housing and the extended measuring position in which the end portion extends from the housing;
   displacement means adapted to be operated by the user for moving the blade longitudinally from the secure position to the extended position;
   the end portion of the blade having a contact side adapted to be placed into heat transfer engagement with the object surface when the end portion is in the extended position for rapidly establishing an equilibrium temperature in the end portion substantially equal to the temperature of the object surface under the end portion;
   the end portion having an opposed temperature indicating side;
   a series of reversible thermochromic cells formed on the opposed indicating side of the end portion, each cell visually responsive to an incrementally different critical temperature for defining a series of inter-incremental temperature ranges and indicating which range includes the equilibrium temperature of the end portion of the blade; and
   the bending moment portion adapted to bend in response to the user placing the contact side of the blade into heat transfer engagement with the object surface for providing a bending moment force which urges the contact side into engagement with the object surface.

12. The device of claim 11, wherein the elongated housing encloses the blade and has a laterally extending end aperture therethrough at the end of the channel for permitting the end portion of the blade to extend from the housing into the extending position.

13. The device of claim 12, wherein the housing has a slot opening extending longitudinally along the housing; and the displacement means is formed by a knob portion extending outward from the base portion of the blade through the slot to permit longitudinal displacement of the blade by the user.

14. The device of claim 13, wherein the displacement means further comprises:

a return spring means connected between the housing and the blade which becomes loaded when the user displaces the knob portion in the one longitudinal direction to extend the end portion into the extended position, and which moves the blade in the other longitudinal direction when the user releases the knob portion to return the blade to the secure position within the housing.

15. The device of claim 13, wherein the base portion of the blade is bowed causing the base portion to engage the longitudinal channel with sufficient force to prevent free motion of the blade.

16. The device of claim 15, wherein the slot opening has position detents which engage the knob portion for defining the extended position and the secure position.

17. The device of claim 12, wherein the longitudinal channel extends completely through the housing forming a lateral end aperture at each end thereof permitting the blade to extend from the housing in either longitudinal direction, and the blade has a measuring end portion at each end thereof.

18. The device of claim 12, wherein the blade is formed of copper beryllium.

* * * * *